(12) United States Patent
Lubin et al.

(10) Patent No.: US 7,295,681 B2
(45) Date of Patent: Nov. 13, 2007

(54) METHOD AND APPARATUS FOR PROVIDING IMPROVED WORKFLOW FOR DIGITAL WATERMARKING

(75) Inventors: Jeffrey Lubin, Princeton, NJ (US); Thomas Catanese, Metuchen, NJ (US); Christos Polyzois, Lawrenceville, NJ (US); Jayakrishnan Eledath, Robbinsville, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 11/342,260

(22) Filed: Jan. 27, 2006

(65) Prior Publication Data

US 2006/0177095 A1 Aug. 10, 2006

Related U.S. Application Data

(60) Provisional application No. 60/647,550, filed on Jan. 27, 2005.

(51) Int. Cl.
*G06K 9/00* (2006.01)
*H04N 7/167* (2006.01)
*H04L 9/00* (2006.01)

(52) U.S. Cl. .................. 382/100; 380/201; 705/57; 713/176

(58) Field of Classification Search ................ 382/100; 380/201, 202; 705/57, 58, 51, 52, 53, 54; 713/176
See application file for complete search history.

(56) References Cited

U.S. PATENT DOCUMENTS

| 2002/0141584 | A1* | 10/2002 | Razdan et al. | ............... 380/203 |
| 2002/0168082 | A1* | 11/2002 | Razdan | ....................... 382/100 |
| 2003/0033347 | A1* | 2/2003 | Bolle et al. | ................. 709/107 |
| 2003/0112974 | A1* | 6/2003 | Levy | ........................... 380/210 |
| 2004/0009763 | A1* | 1/2004 | Stone et al. | ................. 455/410 |

* cited by examiner

*Primary Examiner*—Andrew W. Johns
*Assistant Examiner*—Anthony Mackowey
(74) *Attorney, Agent, or Firm*—Lowenstein Sandler PC

(57) ABSTRACT

A method and apparatus for providing an improved workflow for digital watermarking during a production process. The invention provides a content tracking authority facility that forms a centralized location for storing and distributing watermarks and locations within a payload to place the watermarks. All post-production facilities that are involved in processing a particular payload (e.g., any content that can be watermarked, including video content) connect to the content tracking authority facility to receive watermarks for the content they are processing as well as locations within the content to use to place the watermark.

16 Claims, 6 Drawing Sheets

METHOD AND APPARATUS FOR PROVIDING IMPROVED WORKFLOW FOR DIGITAL WATERMARKING

CROSS-REFERENCE TO RELATED APPLICATIONS

This application claims the benefit of U.S. Provisional Patent Application Ser. No. 60/647,550 filed on Jan. 27, 2005, which is herein incorporated by reference.

FIELD OF THE INVENTION

The present invention generally relates to digital watermarking. More specifically, the invention relates to a method and apparatus for improving workflow for digital watermarking.

DESCRIPTION OF THE RELATED ART

A major barrier to the development and deployment of distribution channels for motion imagery content, e.g., video download, digital cinema, and the like, is the concern of content providers that their copyrighted material may be copied and then subsequently distributed without appropriate authorization. Encryption is an important component of a Digital Rights Management (DRM) approach to controlling access to the content. However, once access has been granted, the decrypted content is left unprotected. Thus, encryption alone cannot prevent all instances of theft. Persistent access control methods that rely on proprietary file formats and the use of compliant devices have been proposed, but ultimately all video must be converted to pixel brightness and color for display. At this point, the video is vulnerable to unauthorized copying.

Given these potential leaks, a content owner needs forensic tools that enable the tracking of unauthorized copies back to the party who licensed the use of the content and who is responsible for preventing further distribution. The ability of the content owners to identify the exact distribution point at which the material was stolen can be used as a tool to identify the responsible parties and can act as a deterrent to such theft. One such tool that can be used in this manner is a watermark that is embedded within the imagery. The watermark can be used to identify the content and the licensee of the content. One technique for watermarking video is described in commonly assigned U.S. patent application Ser. No. 10/124,995, filed Apr. 18, 2002, which is incorporated herein by reference.

Such watermarking techniques are generally used by a movie studio to watermark the video prior to creating a video master. In this manner, unauthorized copying in the distribution chain of the product can be detected. However, such watermarking at the end of the video production process allows for possible misappropriation of video content during the video production process. Loss of control of video content prior to release of a product can be just as damaging as unauthorized copying of the final product.

Therefore, there is a need in the art for a method and apparatus for improving workflow for digital watermarking during the production process.

SUMMARY OF THE INVENTION

The invention is a method and apparatus for providing an improved workflow for digital watermarking during a production process. The invention provides a content tracking authority facility that forms a centralized location for storing and distributing watermarks and locations within a payload to place the watermarks. All post-production facilities that are involved in processing a particular payload (e.g., any content that can be watermarked, including video content) connect to the content tracking authority facility to receive watermarks for the content they are processing as well as locations within the content to use to place the watermark.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
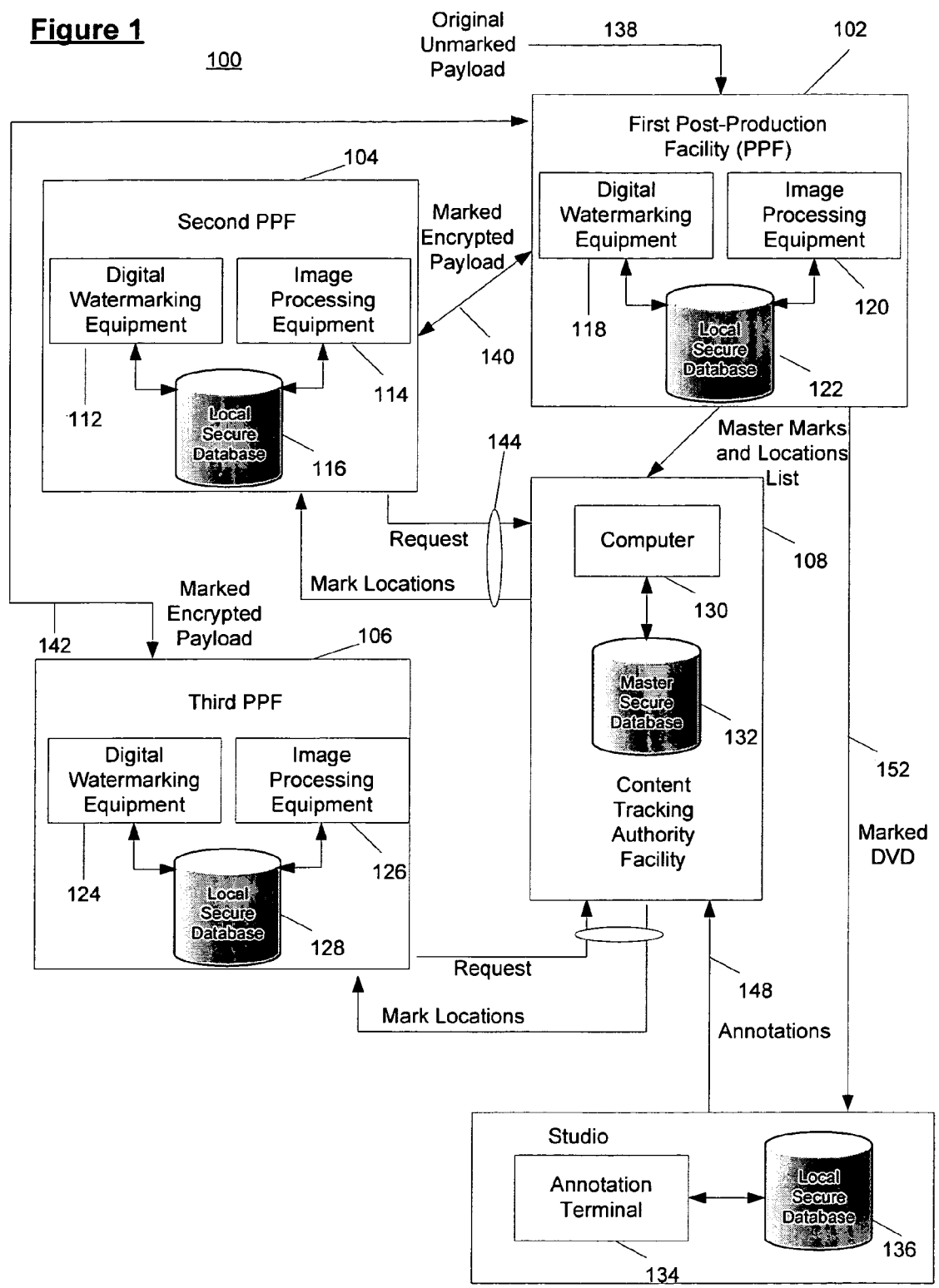
FIG. 1 is a block diagram illustrating an example architecture 100 for digitally watermarking during a production process.

FIG. 1 is a block of an architecture 100 for digitally watermarking a digital media (e.g., video) during a production process in accordance with one embodiment of the present invention. The architecture 100 includes a first post-production facility ("PPF") 102, a second PPF 104, a third PPF 106, and a production-studio facility ("PSF") or studio 110, each of which may communicate with a content-tracking-authority facility ("CTAF") 108. The post production facilities are also known in the industry as post-production houses.

To produce digital media, for example, a digital video, each post-production facility performs particular functions with respect to particular portions of the video. These functions may include editing, special effects, graphics, audio effects, and the like. To perform these functions, the PPFs may create a number of copies of the video. In accordance with one embodiment of the invention, the first PPF 102 receives original unmarked payload, e.g., imagery that does not contain watermarking. The first PPF 102 ensures that the content tracking authority 108 has information to ensure that the payload will be securely processed by the various other PPFs, e.g., PPF 104 and 106. Although three PPFs are shown, those skilled in the art will realize that many PPFs may be utilized to produce video content, for example, for use in a feature film.

The PPFs 102, 104, and 106 are interconnected by a communication network such as the Internet or a private network. Generally, the transmission of the payload (i.e., an image, video, audio or other information that can be watermarked) is sent in an encrypted form to reduce the likelihood that the payload or a portion thereof will be misappropriated during production. In the embodiment shown, the first PPF 102 accepts the original unmarked payload. After performing its function, the payload is communicated through path 140 to the second PPF 104 and through path 142 to PPF 106. In a conventional processing procedure, the payload or a portion thereof might be misappropriated at any step of this process. Within the PPFs, the payload may be copied to facilitate processing. In the present invention, each PPF 102, 104, 106 uses watermarking technology to mark copies of the payload with an invisible watermark. The watermark may contain information such as the date, a PPF identifier, and a content identifier. In this manner, a misappropriated payload or portion thereof could be analyzed to identify where the "leak" occurred within the production process and measures could be implemented to correct the leak.

To produce and insert the watermark into the payload, each PPF 102, 104, and 106 respectively comprises digital watermarking equipment 118, 112, and 124. This equipment operates in conjunction with image processing equipment 114, 120 and 126 that performs the functions of a respective PPF 104, 102, and 106. The image processing equipment may be within the PPF or may be at another contracted production facility. Furthermore, each PPF 102, 104 and 106 comprises a local secure database 122, 116 and 128 that is coupled to both the digital watermarking equipment 118, 112, and 124 and the image processing equipment 114, 120, and 126. The local secure database stores payload, watermarks, and locations for inserting the watermarks into the payload.

To coordinate watermarking amongst the PPFs, the first PPF 102, the second 104, the third PPF 106, and the PSF 110 exchange with the CTAF 108 information associated with watermarking the payload ("watermarking information"). Each of the first PPF 102, the second PPF 104, the third PPF 106, and the PSF 110 may use this watermarking information to respectively watermark the payload so as to indicate that such facility performed its function (e.g., enhanced the media quality) to the payload. An example of a system and method for watermarking the payload, including a spatio-temporal watermarking technique, may be found in commonly-assigned, co-pending U.S. patent application Ser. No. 10/124,995, filed on Apr. 18, 2002, entitled "Secure Robust Hi-Fidelity Watermarking," which is incorporated herein by reference in its entirety. This technique forms one of many techniques that could be used by the digital watermarking equipment 112, 118, and 124 to watermark the payload.

The content tracking authority facility 108 coordinates the watermarking of the payload as the payload is processed by each PPF 102, 104, or 106. To place watermark data into a payload and have the watermark be invisible, the mark is generally positioned in a specific location that is best suited for hiding the watermark. To determine the locations for the marks, the digital watermarking equipment 118 of PPF 102 analyzes the original unmarked payload to identify locations. The first PPF 102 creates a master marks and locations list that is communicated along path 150 to the CTAF 108. This list is stored in a master secure database 132. Access to the master secure database 132 is controlled by a computer 130. To mark the payload at each PPF, the PPF sends a request for a mark location and the CTAF 108 responds with an appropriate mark location. Generally, the local secure databases of the PPFs will be preloaded with the watermarks to use. Alternatively, the watermark may be sent to the PPF in response to a request for a watermark location.

More specifically, second PPF 104 communicates with the CTAF 108 through path 144, through which the PPF 104 requests locations to place a watermark in a specific payload and the CTAF 108 responds with the location. Similarly, third PPF 106 requests for locations and is provided locations through path 146. Paths 144 and 146 may be public or private network connections.

The CTAF 108 is also coupled to at least one studio 110. The studio 110 may communicate annotations along path 148. These annotations may include certain information regarding copies of the finished product that are shipped to, for example, screeners. The annotations are generated by an annotation terminal 134 coupled to a local secure database 136 that stores the annotations. By communicating the annotations to the CTAF 108, the CTAF 108 contains information regarding all the copies produced during production, i.e., all the copies made by the PPFs during production and the copies made for the studio of the final product.

The marked, encrypted payload is generally coupled between the PPFs using public or private communications networks. In some instances, the payload may be processed by a given PPF more than once. After all processing is complete, the first PPF 102 produces at least one digital versatile disk (DVD) or other content bearing medium for the at least one studio 110. The DVD or other medium is provided to the studio as represented by path 152.

The augmentations (image processing) performed by (and marks placed by the watermarking of the media by) each of the PPF 102, the PPF 104, and the PPF 106 may be cumulative. For example, the second augmentation (i.e., processing performed by the second PPF 104) is cumulative to the first augmentation (i.e., processing performed by the first PPF 102); the third augmentation (i.e., processing performed by the third PPF 106) is cumulative to the second augmentation. If the architecture 100 includes more than three PPFs (not shown), then each of these subsequent post-production facilities may perform its particular augmentation in cumulative succession. As mentioned above, a single PPF may be used multiple times during the production process. In other instances, the PPFs may be utilized independently and operate upon separate payloads or different portions of the same payload. In such a situation, the payload would be marked with two watermarks, the watermark of the first PPF 102 and the PPF that performed the processing.

During each process performed by a PPF, the digital watermarking equipment inserts a watermark into the payload. As cumulative processing occurs, multiple watermarks are imbedded into the payload. If the payload were misappropriated during any of these processes, the watermarks would identify the PPF in which the leak occurred.

Figure 2:
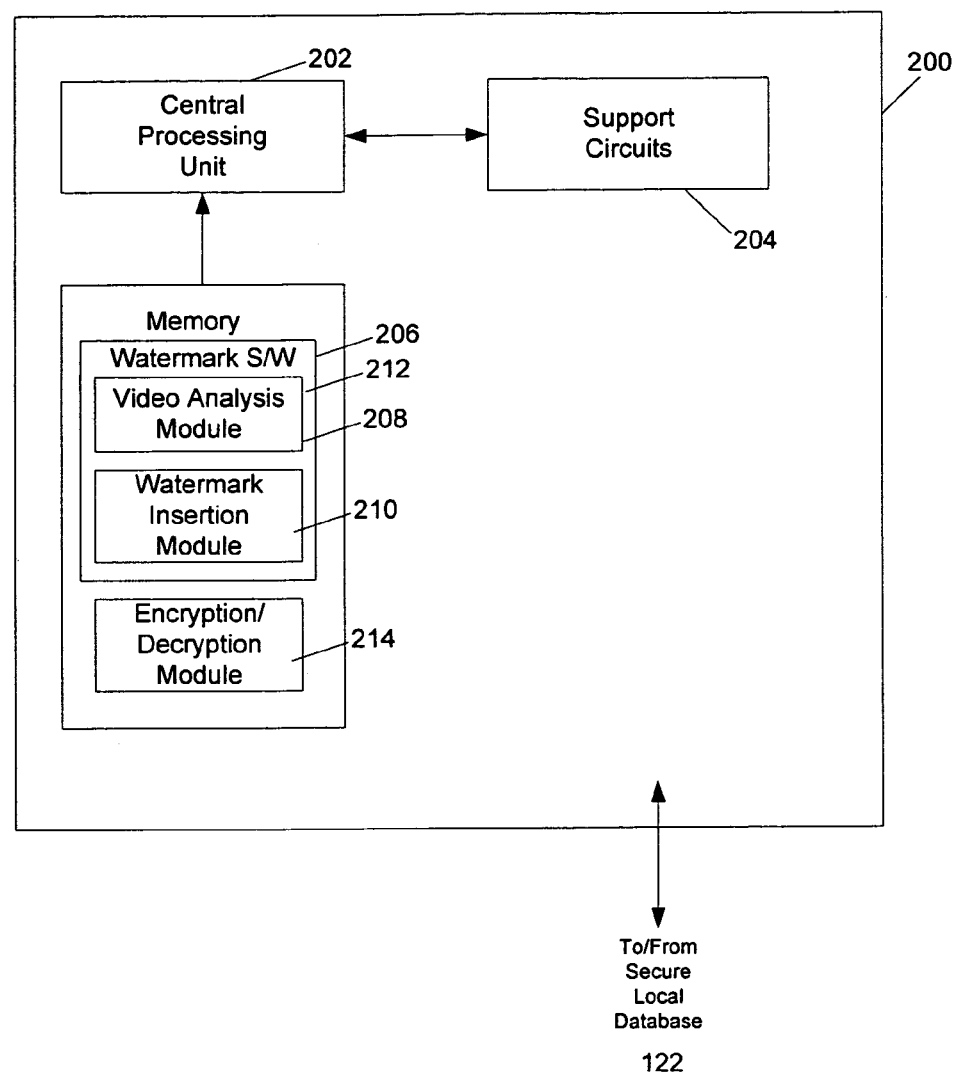
FIG. 2 is a block diagram of digital watermarking equipment.

FIG. 2 is a block diagram illustrating an example of digital watermarking equipment 200 for watermarking digital media. The equipment 200 may be configured to operate as digital watermarking equipment 112, 118 or 124.

The equipment 200 is a general purpose computer that is adapted to be used for digital watermarking. The equipment 200 comprises a central processing unit (CPU) 202, support circuits 204 and memory 206. The CPU 202 may be one or more of any commercially available processors. The support circuits 204 are well known circuits that support the operation of the CPU 202. The support circuits may comprise at least one of clock circuits, cache, power supplies, data communications circuits, network cards, frame buffers, and the like. The memory stores computer software that, when executed, causes the general purpose computer to operate as a specific purpose computer, i.e., as watermarking equipment. The memory may comprise at least one of random access memory, read only memory, removable memory, magnetic memory, disk drives, optical memory, and the like.

The memory 206 comprises watermarking software 212 that contains at least two modules: a video analysis module 208 and a watermark insertion module 210. The video analysis module 208 is used by the first PPF 102 to analyze the original unmarked payload to determine where to place the watermarks. This module is not used by the second and third PPFs 104 and 106. In those PPFs, the module 208 may not exist, or may exist in an inactive state. The watermark insertion module 210 places at least one watermark into the payload. The payload is provided from the secure local database 122 along with the watermark. In one embodiment of the invention the modules 208 and 210 operate in accordance with a method described in commonly-assigned, co-pending U.S. patent application Ser. No. 10/124,995, filed on Apr. 18, 2002. This method analyzes the payload for locations to place the watermark, modulates a watermark carrier with watermark data, and inserts the watermark into the payload at the location previously defined. In the present invention, the first PPF 102 performs the analysis as to the locations for best insertion, while all the PPFs are capable of inserting watermarks in the defined locations. Using the technique cited above, the watermarking software 212 encodes the watermark into a three-dimensional spatio-temporal volume comprising a plurality of video frames. Other watermarking techniques that use three-dimensional or two-dimensional watermarks may also be used in conjunction with this invention.

The memory 214 also comprises an encryption/decryption module for performing communications encryption and decryption. All critical communications amongst the facilities of the architecture 100 are performed using a conventional encryption technique such as a public key based encryption. The keys are stored in the local secure database of each PPF. By encrypting the payload before transmission between PPFs, a leak may only occur once the payload is decrypted. Since, as discussed below, the decryption process and the watermarking process are closely coupled, the watermark for the PPF will be added to the payload before a leak is possible.

Figure 3:
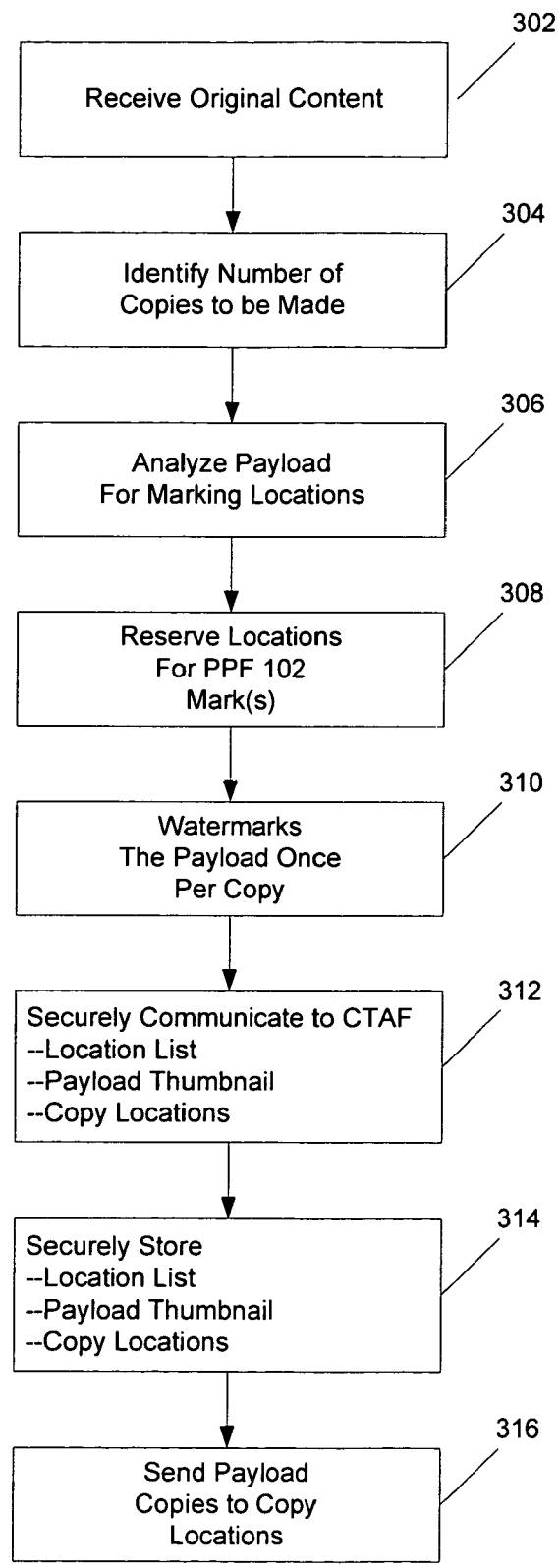
FIG. 3 is a flow diagram of a method of operation of a first post-production facility within the architecture of FIG. 1.

FIG. 3 depicts a flow diagram of a method 300 of operation of the first PPF 102. At step 302, the PPF 102 receives the original content. At step 304, the method identifies the number of copies to be made. Generally, this is a user defined parameter. At step 306, the payload is analyzed to identify the marking locations and, at step 308, certain ones of those locations are reserved for use by the first PPF 102. The selection of the locations to be used by the first PPF 102, may be random. At step 310, the selected locations are used to insert a watermark in each of the payload copies. As such, each copy is identified as having been processed by PPF 102. At step 312, the PPF 102 sends to the CTAF 108 a list of locations that can be used to watermark the payload, a thumbnail of the payload, and a list of location (recipients) where the payload copies are being sent, i.e., identify the other PPFs that are to receive payload copies. At step 314, the information that was communicated to the CTAF 108 is stored in the local secure database 122. Lastly, at step 316, the payload copies containing the PPF 102 watermark are encrypted and sent to the locations in the copy list, e.g., via paths 140 and/or 142.

Figure 4:
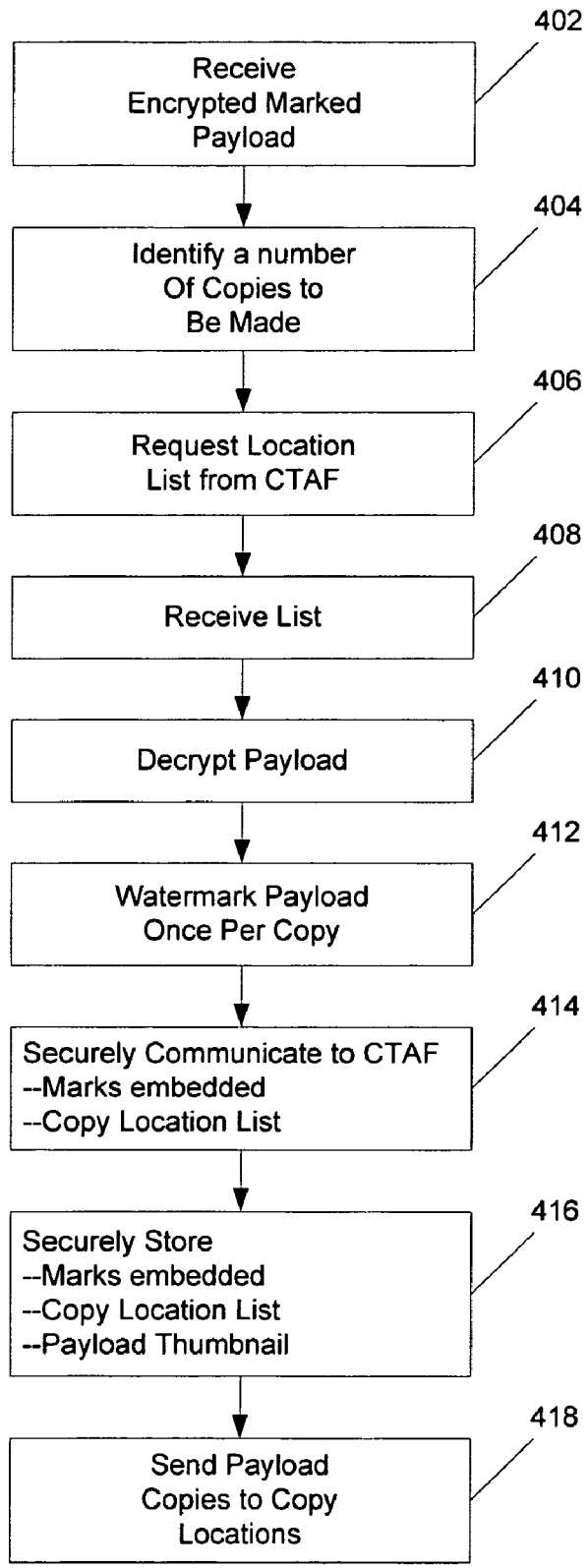
FIG. 4 is a flow diagram of a method of operation of other post-production facilities within the architecture of FIG. 1.

FIG. 4 depicts a flow diagram of a method 400 of operation of a PPF such as PPF 104 or 106. The method 400 begins at step 402 where the PPF 104 or 106 receives the encrypted marked payload from the first PPF 102. At step 404, the method identifies the number of copies to be made for processing by the PPF. At step 406, the PPF sends a request to the CTAF for the mark location list and the list is received at step 408. Once the list is received, the method 400, at step 410, decrypts the payload. At step 412, the PPF watermarks the payload using the locations in the list provided by the CTAF. Generally, one watermark is embedded per copy. At step 414, the method sends to the CATF the marks embedded, a payload thumbnail, and a list of the locations (recipients) to which copies of the payload are to be sent. The same information is locally stored in the local secure database at step 416. Lastly, at step 418, the method 400 sends the payload copies having the marks from PPF 102 and PPF 104/106 to the locations (recipients) in the list.

Figure 5:
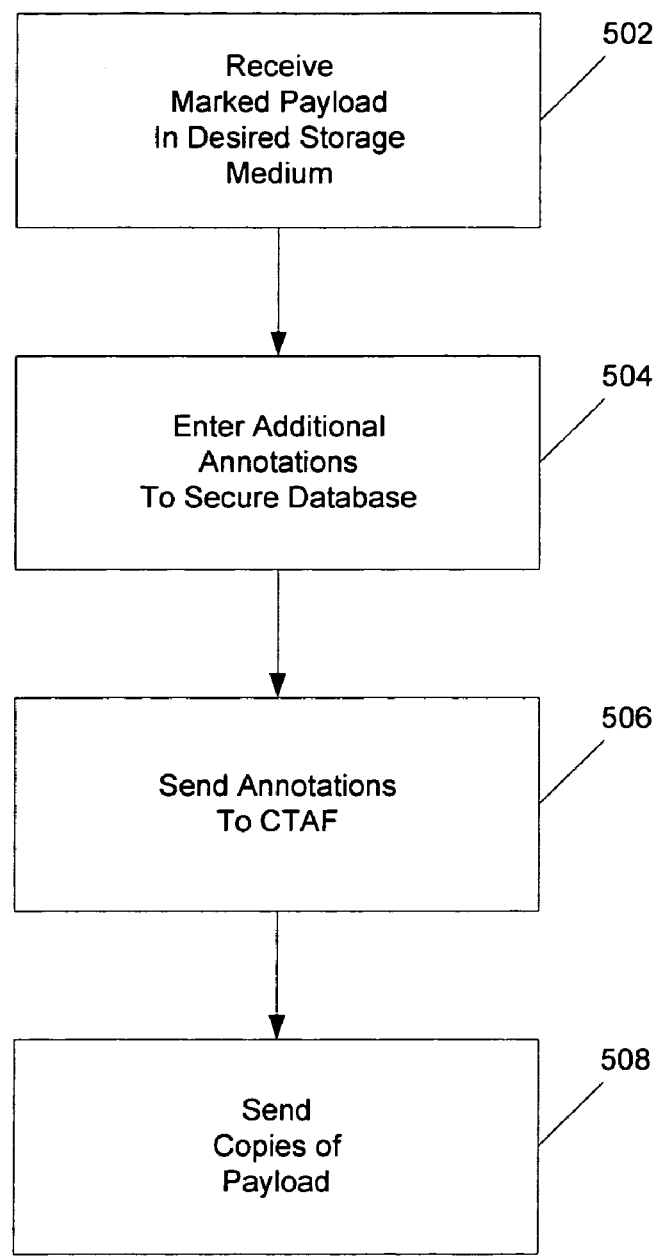
FIG. 5 is a flow diagram of a method of operation of a studio within the architecture of FIG. 1.

FIG. 5 depicts a flow diagram of a method 500 of operation of the studio 110. The method 500 begins at step 502 where the studio receives the marked payload in a desired storage medium. At step 504, the studio enters additional annotations into the local secure database about the payload, e.g., number of copies being shipped, recipient's names and locations, and the like. At step 506, the annotations are communicated to the CTAF for storage. Lastly, at step 508, the copies of the payload are sent to the recipients, e.g., screeners.

Figure 6:
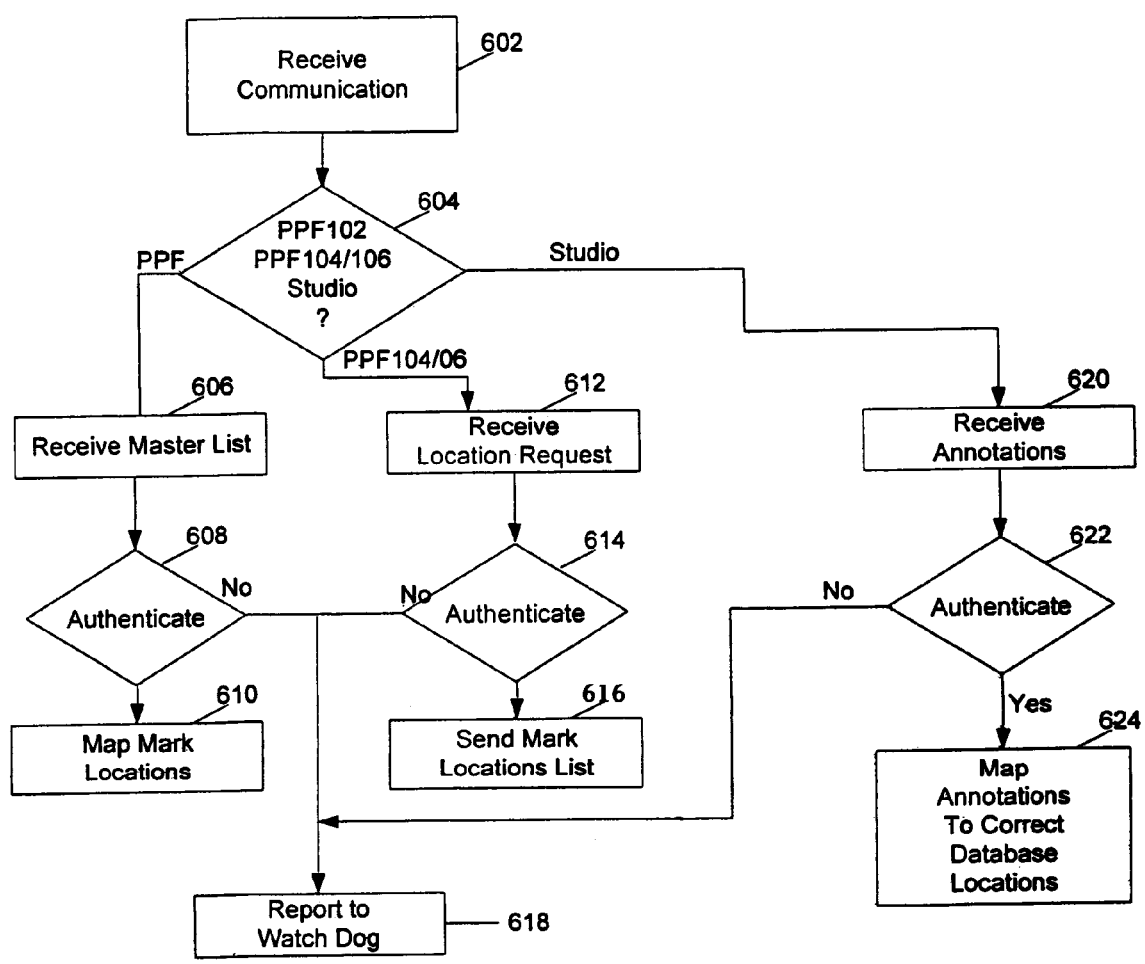
FIG. 6 is a flow diagram of a method of operation of content tracking authority facility within the architecture of FIG. 1.

FIG. 6 depicts a flow diagram of a method 600 of operation of the CTAF 108. The method 600 begins at step 602 where the CTAF receives a communication from any of the facilities in the architecture 100. At step 604, the method 600 queries whether the communication was sent by the first PPF 102, one of the other PPFs 104/106 or the studio 110. The sending party can be identified using standard communication techniques. If the communication was received from the first PPF 102, the method proceeds to step 606.

At step 606, the CTAF receives the master list of marks and mark locations. The communication is checked, at step 608, for authenticity using a conventional technique. If the communication is deemed authentic, at step 610, the method 600 maps the mark locations to the correct location in the master secure database 132. This mapping is based on information about the payload being marked and the PPFs that are doing the marking. If the communication is not authentic, the method 600 proceeds to step 618 to report the errant communication to a watchdog service.

If, at query 604, the communication is from the other PPFs (e.g., PPF 104 or 106), the method 600 proceeds to step 612. At step 612, the CATF receives a mark location request. At step 614, the method 600 checks whether the communication is authentic. If the communication is authentic, the method 600 accesses the master database and sends, at step 616, an encrypted mark locations list. If the communication is not authentic, the method 600 proceeds to step 618 to report the incident to the watchdog service.

If, at query 604, the communication is from the studio 110, the method 600 proceeds to step 620. At step 620, the CATF receives studio annotations. At step 622, the method 600 checks whether the communication is authentic. If the communication is authentic, the method 600 maps, at step 624, the annotations to the correct locations in the master database. The correct locations are those locations that are identified with the payload and the studio. If the communication is not authentic, the method 600 proceeds to step 618 to report the incident to the watchdog service.

Although various embodiments which incorporate the teachings of the present invention have been shown and described in detail herein, those skilled in the art can readily devise many other varied embodiments that still incorporate these teachings.

We claim:

1. Apparatus of improving workflow for watermarking comprising:
   a plurality of post-production facilities comprising digital watermarking equipment; and
   a content tracking authority facility for communicating with the digital watermarking equipment of each post-production facility to control a watermarking procedure used by the digital watermarking equipment of each of the post-production facilities;
   wherein a first post-production facility of said plurality of post-production facilities identifies a master list of watermarks to be used by all post-production facilities and a list of locations to insert the watermarks within a payload to be used by all post-production facilities and sends the master list of watermarks and the list of locations to said content tracking authority facility.

2. The apparatus of claim 1 further comprising a studio for providing annotations to the content tracking authority facility.

3. The apparatus of claim 1 wherein the digital watermarking equipment comprises a video analysis module for identifying locations within a payload to embed watermarks.

4. The apparatus of claim 1 wherein the digital watermarking equipment comprises a watermark insertion module.

5. The apparatus of claim 1 wherein the first post-production facility inserts at least one watermark into the payload prior to sending the payload to other post-production facilities.

6. The apparatus of claim 5 wherein the other post production facilities insert at least one watermark in the payload upon receiving the payload from the first post-production facility.

7. The apparatus of claim 1 wherein the content tracking authority facility comprises a database for storing locations to embed a watermark within a payload.

8. The apparatus of claim 1 wherein communication between the post-production facilities and the content tracking authority facility is encrypted.

9. A method comprising:
   identifying a list of locations for embedding a watermark within a payload to be used by all post-production facilities of a plurality of post-production facilities, the list of locations being determined by a first post production facility;
   identifying a master list of watermarks to be used by all post-production facilities of the plurality of post-production facilities, the master list of watermarks being determined by the first post-production facility;
   sending the list of the locations and the master list of watermarks from the first post-production facility to a content tracking authority facility; and
   inserting a watermark into the payload at the first post-production facility using the list of locations and the master list of watermarks.

10. The method of claim 9 further comprising: requesting from the content tracking facility a location to insert a watermark into the payload.

11. The method of claim 9 wherein the list is sent using an encrypted communication.

12. The method of claim 9 wherein the payload is sent using an encrypted communication.

13. The method of claim 9 further comprising providing watermarks and watermark locations from a content tracking authority facility.

14. The method of claim 13 further comprising storing, at the content tracking authority facility, annotations regarding copies of a product released by a studio that contains the payload.

15. A method comprising:
   identifying a list of locations for embedding a watermark within a payload to be used by all post-production facilities of a plurality of post-production facilities, the list of locations being determined by a first post production facility;
   identifying a master list of watermarks to be used by all post-production facilities of the plurality of post-production facilities, the master list of watermarks being determined by the first post-production facility;
   sending the list of the locations and the master list of watermarks from the first post-production facility to a content tracking authority facility;
   inserting a watermark into the payload at the first post-production facility using at least one of the locations and at least one of the watermarks from the master list;
   sending the payload containing the watermark from the first post-production facility to at least one other of the plurality of post-production facilities; and
   inserting a second watermark into the payload at the at least one other post-production facility using at least one other of the locations and at least one of the watermarks from the master list.

16. Apparatus of improving workflow for watermarking comprising:
   a plurality of post-production facilities comprising digital watermarking equipment; and
   a content tracking authority facility for communicating with the digital watermarking equipment of each post-production facility to control a watermarking procedure used by the digital watermarking equipment of each of the post-production facilities;
   wherein a first post-production facility of said plurality of post-production facilities identifies a list of locations to insert the watermarks within a payload to be used by all post-production facilities and a master list of watermarks to be used by all post-production facilities and sends the list of locations and the master list of watermarks to said content tracking authority facility and wherein the first post-production facility sends the payload containing a watermark from the list of locations and the master list of watermarks to at least one other post-production facility.

* * * * *